(12) United States Patent
Allgaier et al.

(10) Patent No.: US 9,578,799 B2
(45) Date of Patent: Feb. 28, 2017

(54) SEED METER UNLOADING SYSTEMS, METHODS, AND APPARATUS

(71) Applicant: Precision Planting LLC, Tremont, IL (US)

(72) Inventors: Ryan Allgaier, East Peoria, IL (US); Jason Stoller, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 14/503,249

(22) Filed: Sep. 30, 2014

(65) Prior Publication Data

US 2015/0090166 A1      Apr. 2, 2015

Related U.S. Application Data

(60) Provisional application No. 61/884,509, filed on Sep. 30, 2013.

(51) Int. Cl.
| | | |
|---|---|---|
| *A01C 7/04* | (2006.01) | |
| *A01C 21/00* | (2006.01) | |
| *A01C 7/08* | (2006.01) | |
| *A01C 7/10* | (2006.01) | |

(52) U.S. Cl.
CPC .............. *A01C 7/046* (2013.01); *A01C 7/088* (2013.01); *A01C 7/105* (2013.01); *A01C 21/005* (2013.01)

(58) Field of Classification Search
CPC ........... A01C 7/00; A01C 7/046; A01C 7/044; A01C 21/005

USPC ......... 111/179, 180, 183, 184, 185; 221/211, 221/278

See application file for complete search history.

(56) References Cited

U.S. PATENT DOCUMENTS

| | | | | |
|---|---|---|---|---|
| 8,234,988 B2 * | 8/2012 | Zielke | ..................... | A01C 7/046 111/185 |
| 8,850,997 B2 * | 10/2014 | Silbernagel | ............ | A01C 7/046 111/185 |
| 8,925,762 B2 * | 1/2015 | Deppermann | .......... | B65B 35/28 221/175 |
| 9,155,241 B2 * | 10/2015 | Rans | ....................... | A01C 7/046 |
| 2013/0124055 A1 * | 5/2013 | Baurer | .................... | H04L 5/005 701/50 |
| 2015/0237794 A1 * | 8/2015 | Sauder | ................. | A01C 21/005 111/174 |
| 2015/0319916 A1 * | 11/2015 | Garner | ..................... | A01C 7/08 111/171 |
| 2016/0007523 A1 * | 1/2016 | Rylander | ............... | A01C 7/044 111/185 |

* cited by examiner

*Primary Examiner* — John G Weiss
(74) *Attorney, Agent, or Firm* — Thomas J. Oppold; Larkin Hoffman Daly & Lindgren Ltd.

(57) ABSTRACT

Systems, methods and apparatus are provided for controlling an agricultural implement having a plurality of row units. In some embodiments, seeds are planted by rotating a seed disc in a first direction; seeds are then unloaded from a seed disc into a seed pool by rotating the seed disc in a second direction. In some such embodiments an amount of rotation in the second rotation is selected to ensure that seeds are released into the seed pool and not released from the from the seed meter.

18 Claims, 7 Drawing Sheets

SEED METER UNLOADING SYSTEMS, METHODS, AND APPARATUS

BACKGROUND

Increased seed costs and increased awareness among farmers of the agronomic costs of poor seed placement have driven the development of systems for improving seed placement. Systems and apparatus have been developed for stopping seed meters at a desired location using clutches to stop a hydraulically-driven shaft from driving a seed meter, or in the case of electrically driven seed meters, using a signal to command the associated electric motor to stop. However, such systems and apparatus still allow seeds to be dropped from the seed meter in undesired locations after the motor or shaft is stopped. Thus there is a need in the art for systems, methods and apparatus of stopping a seed meter without dropping unwanted seeds from the meter; e.g., unloading a seed meter.

DESCRIPTION

Planter Monitoring and Control System

Figure 1:
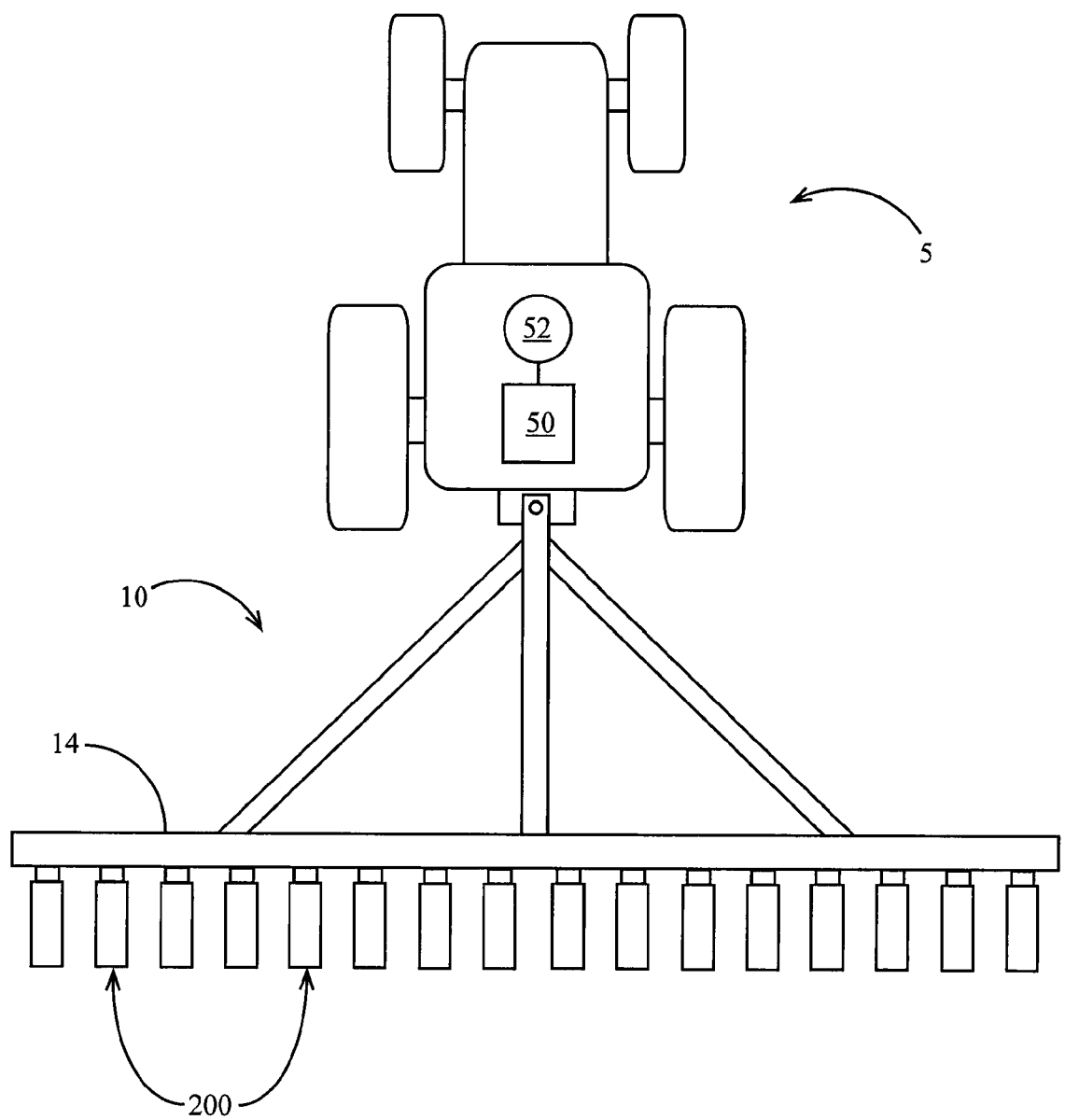
FIG. 1 is a top view of an embodiment of an agricultural planter.

Referring now to the drawings, wherein like reference numerals designate identical or corresponding parts throughout the several views, FIG. 1 illustrates a tractor 5 drawing an agricultural implement, e.g., a planter 10, comprising a toolbar 14 operatively supporting multiple row units 200. An implement monitor 50 preferably including a central processing unit ("CPU"), memory and graphical user interface ("GUI") (e.g., a touch-screen interface) is preferably located in the cab of the tractor 10. A global positioning system ("GPS") receiver 52 is preferably mounted to the tractor 10.

Figure 2:
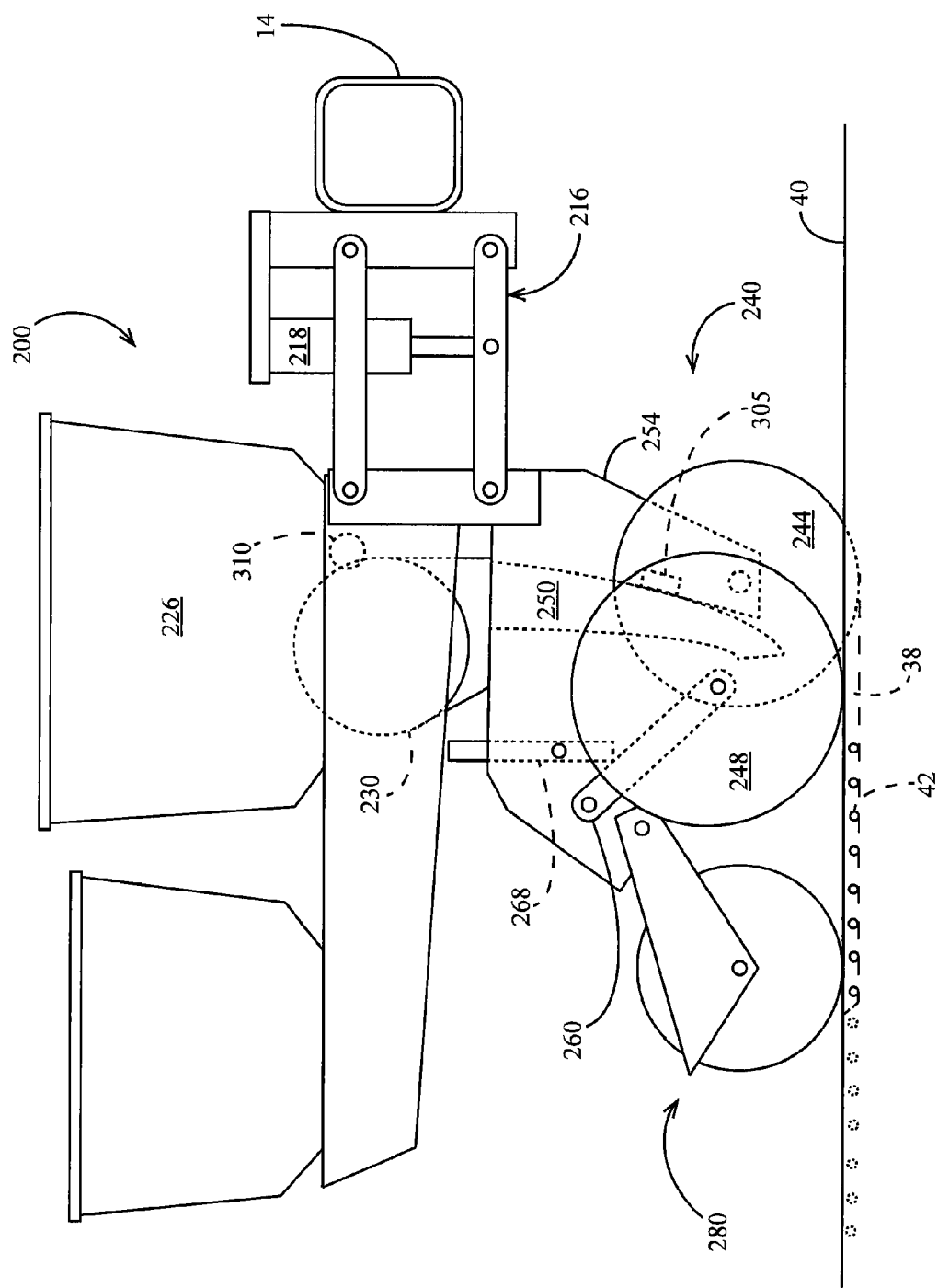
FIG. 2 is a side elevation view of an embodiment of a planter row unit.

Turing to FIG. 2, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. An opening system 240 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248.

Continuing to refer to FIG. 2, a seed meter 230 such as that disclosed in Applicant's co-pending International Patent Application No. PCT/US2012/030192, the disclosure of which is hereby incorporated herein by reference, is preferably disposed to deposit seeds 42 from a hopper 226 into the trench 38, e.g., through a seed tube 250 disposed to guide the seeds toward the trench. The seed meter 230 is preferably driven by an electric drive 310 configured to drive a seed disc within the seed meter. A seed sensor 305 (e.g., an optical or electromagnetic seed sensor configured to generate a signal indicating passage of a seed) is preferably mounted to the seed tube 250 and disposed to send light or electromagnetic waves across the path of seeds 42. A closing system 280 including one or more closing wheels is pivotally coupled to the row unit 200 and configured to close the trench 38.

Figure 3:
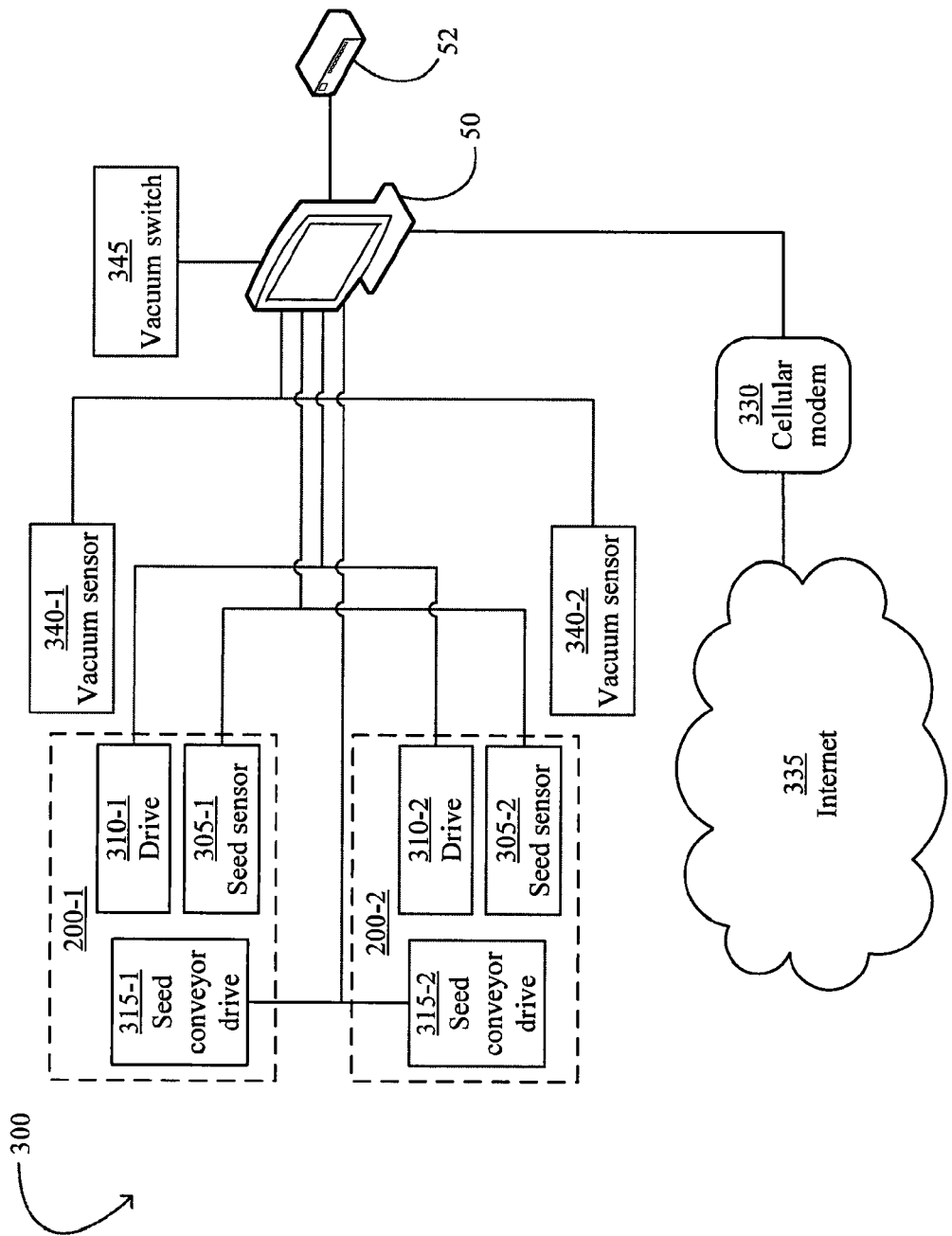
FIG. 3 schematically illustrates an embodiment of a planter monitoring and control system.

Turning to FIG. 3, a planter monitoring and control system 300 is schematically illustrated. The monitor 50 is preferably in electrical communication with components associated with each row unit 200 including the drives 310, and the seed sensors 305. The monitor 50 is preferably in electrical communication with at least one vacuum sensor 340 and the GPS receiver 52. The vacuum sensor 340 is preferably a transducer configured to generate a signal related to a pressure associated with one or more seed meters 230. In one embodiment, the vacuum sensor 340 is disposed to measure a pressure (i.e., vacuum level) in a pneumatic line supplying vacuum to one of the seed meters 230. In another embodiment, the vacuum sensor 340 is disposed to measure a pressure inside one of the seed meters 230. The monitor 50 is preferably in electrical communication with a vacuum switch 345; the vacuum switch is preferably configured to selectively activate or deactivate a vacuum impeller in fluid communication with the seed meters 230 for pulling a vacuum in the seed meters.

Continuing to refer to FIG. 3, in embodiments in which the row unit 200 includes a seed conveyor, the monitor 50 is preferably in electrical communication with a seed conveyor drive 315 configured to drive the seed conveyor. The seed conveyor is preferably configured to convey seeds from the meter 230 to the trench 38; the seed conveyor is preferably one of the embodiments disclosed in Applicant's co-pending PCT/US2012/057327, the entire disclosure of which is hereby incorporated herein by reference.

Continuing to refer to FIG. 3, the monitor 50 is preferably in electrical communication with a cellular modem 330 or other component configured to place the monitor 50 in data communication with the Internet, indicated by reference numeral 335. Via the Internet connection, the monitor 50 is preferably enabled to receive planting prescriptions and other data.

In FIG. 3, two row units 200-1, 200-2 are illustrated with associated components labeled with like suffixes. It should be appreciated that the planter 10 may include a larger plurality of row units, e.g., 16 or 48 row units.

Figure 6:
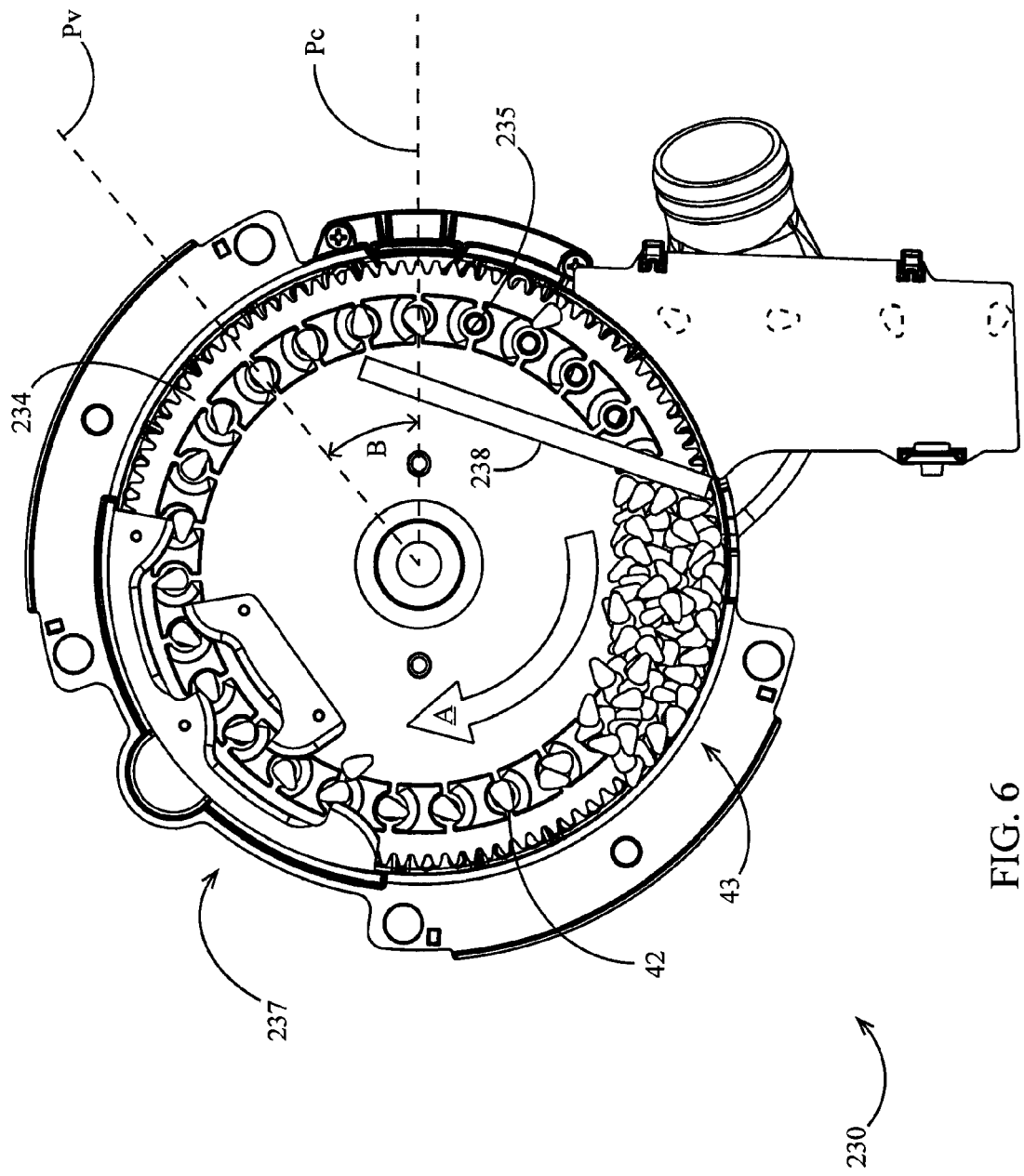
FIG. 6 is a side elevation view of the seed meter of FIG. 4 in operation with a cover removed.

Turning to FIG. 6, the seed meter 230 is shown in operation with the cover 232 removed for illustrative purposes. In operation, a seed disc 234 rotates along the direction indicated by an arrow A. A vacuum imposed on one side of the seed disc 234 (opposite the side shown in FIG. 6) creates a vacuum differential on seed apertures 235 formed in the seed disc such that seeds 42 become entrained on the apertures. Thus the seed disc 234 rotates past a seed pool 43 at approximately the 6 o'clock position and carries entrained seeds 42 along a seed path defined by the seed apertures 235. A portion of the seed path is preferably adjacent to a singulator 237 configured to strip all but one seed from each seed aperture. The vacuum is preferably substantially cut off at a seed release location, e.g., where the seed path intersects a plane Pc. Thus as seeds 42 reach the plane Pc they are released from the disc and fall from the meter into the seed tube 250. A brush 238 is preferably mounted to the cover 232. The brush 238 is preferably disposed to contact the seed disc 234 along its length and brush debris from the seed disc as the seed disc rotates. The brush 238 is preferably disposed to retain seeds 42 in the seed pool 43 such that the seeds do not fall directly out of the meter without being carried out by the seed apertures 235 as described above.

Figure 5:
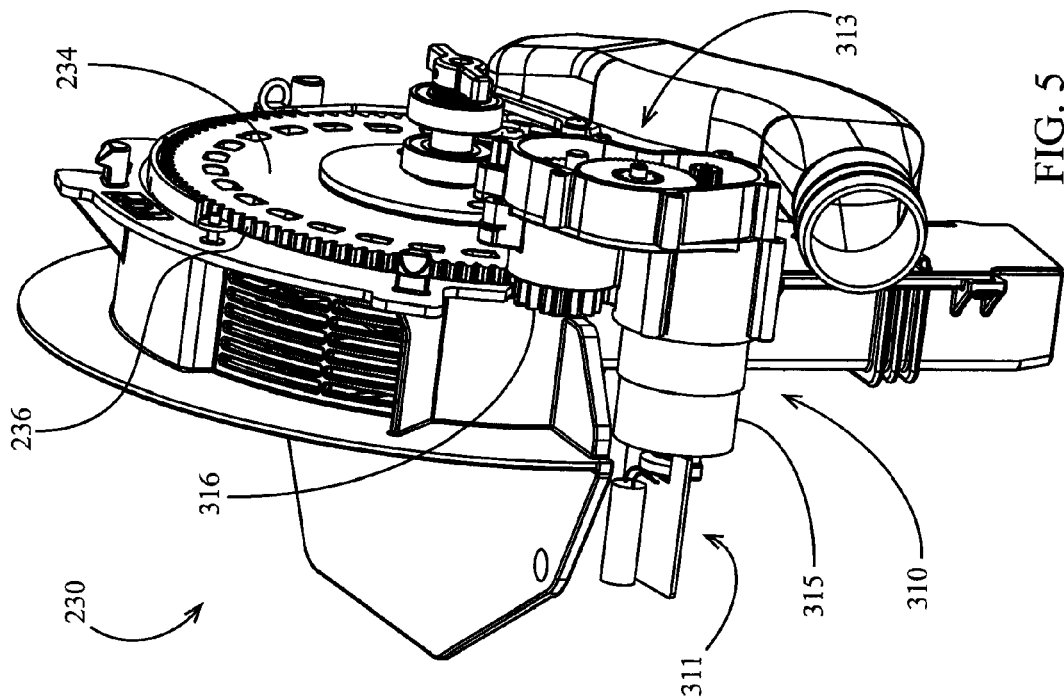
FIG. 5 is a perspective view of the seed meter of FIG. 4 with a cover removed and the seed meter drive of FIG. 4 with a cover removed.
Figure 4:
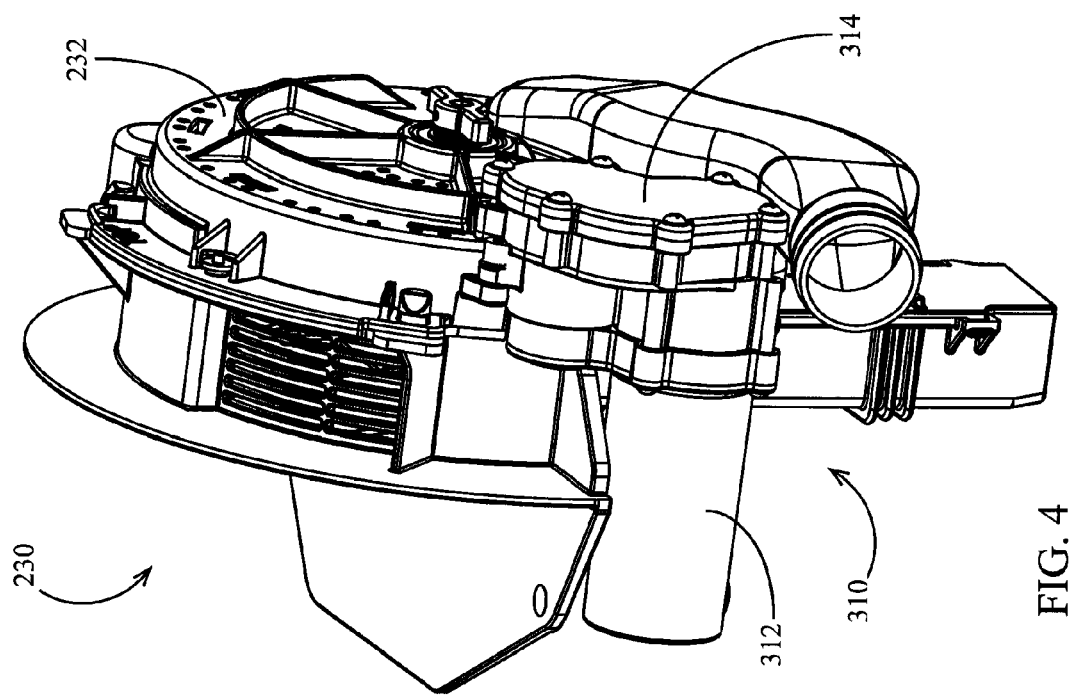
FIG. 4 is a perspective view of an embodiment of a seed meter and an embodiment of a seed meter drive.

Referring to FIGS. 4 and 5, the drive 310 comprises an electrical assembly 311 shielded by a cover 312 and a gearbox 313 shielded by a cover 314. The electrical assembly 311 is in electrical communication with a motor 315 (e.g., a 12 volt electric motor) and configured to control an operating speed of the motor 315. The motor 315 drives an input gear (not shown) of the gearbox 313. The drive 310 is mounted to the seed meter 230. The seed meter is preferably of the type disclosed in Applicant's co-pending international patent applications no. PCT/US2012/030192 and PCT/US2013/051971, the disclosures of which are hereby incorporated herein in their entirety by reference. Specifically, the drive module 310 is mounted to a cover 232 shielding the seed disc 234 housed within the meter 230. The gearbox 313 includes an output gear 316 adapted to drive the seed disc 234 by sequential engagement with gear teeth 236 arranged circumferentially around a perimeter of the seed disc 234.

Meter Unloading Methods

Figure 7:
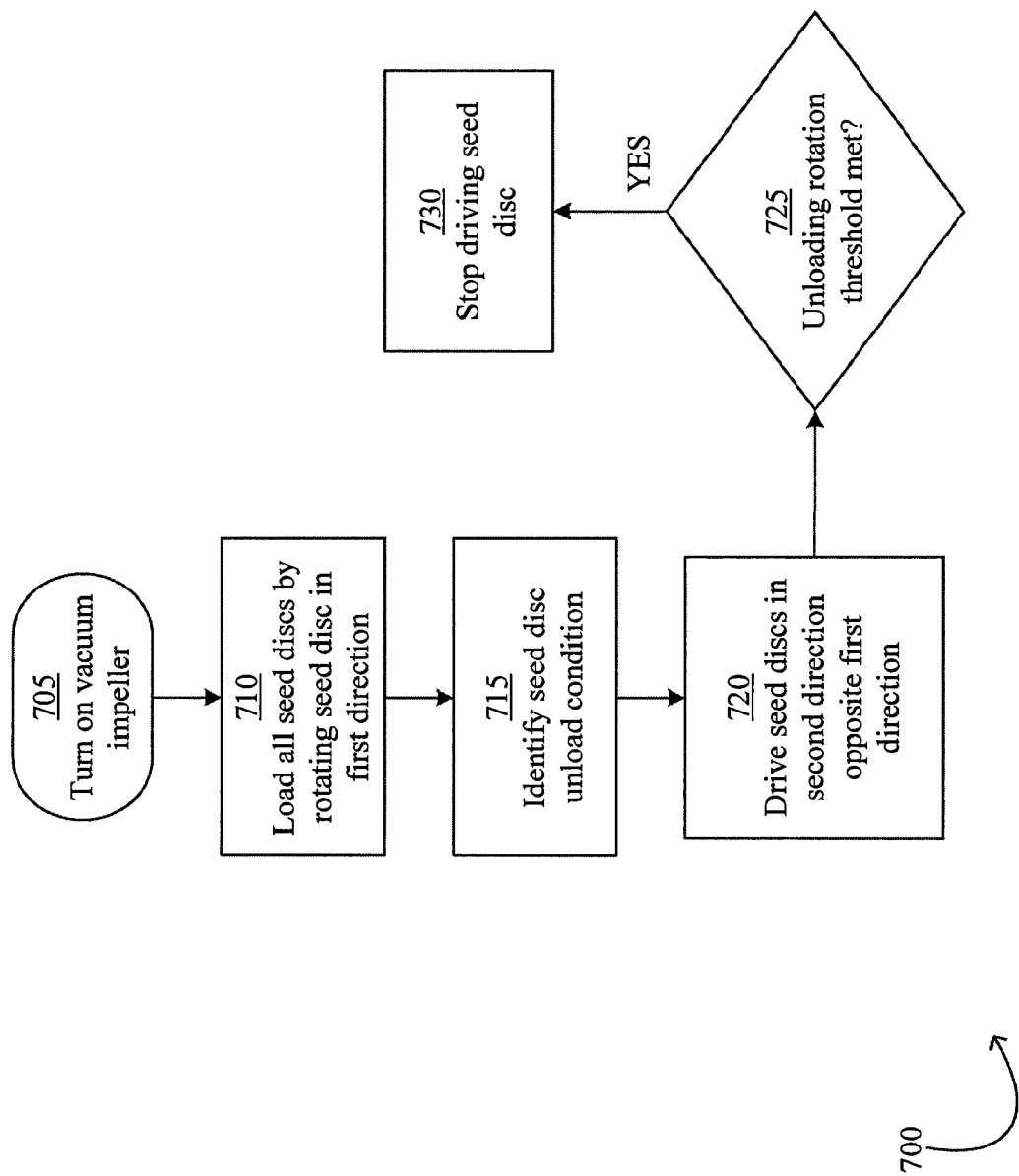
FIG. 7 illustrates a process for unloading a seed meter.

Turning to FIG. 7, a process 700 for unloading seeds from a seed disc 230 is illustrated. At step 705, the monitor 50 preferably commands the vacuum switch 345 to activate the vacuum impeller such that the seed meters 230 impose a vacuum across the seed apertures 235. At step 710, the monitor 50 preferably commands the drives 310 to rotate the seed discs 234 in a first direction, thus loading seeds 42 on the seed discs. Referring to FIG. 6, the first direction is preferably in the direction of the arrow A, i.e., such that one of the seed apertures 235 moves from the seed pool 43 to the plane Pc before passing the brush 238. After step 710 the operator may carry out planting operations. At step 715 the monitor 50 preferably identifies one or more seed unload conditions; in a preferred embodiment, the seed unload conditions are one of the seed unload conditions identified using a process 800 illustrated in FIG. 8 and described later herein. Once a seed disc unload condition has been identified at step 720, the monitor 50 preferably commands the drives 310 to rotate in a second direction opposite the first direction. On the view of FIG. 6, the second direction is preferably opposite the direction of the arrow A. At step 725, the monitor 50 preferably determines whether an unloading rotation threshold has been met. The threshold may comprise a rotation of the seed disc 232, a rotation of the drive 310, or a time of rotation (preferably at a specified or minimum rotational rate) of the drive or seed disc. Once the threshold has been met at step 725, the monitor preferably commands the motor to stop driving the seed discs at step 730.

The threshold applied at step 725 is preferably selected such that seeds 42 will not be released from the meter upon reduction of vacuum in the seed meter 230. For example, referring to FIG. 6, seeds 42 along the seed path between a plane Pv and the plane Pc will be released from the meter 230 when the seeds are released from the seed disc 232 (e.g., by loss of vacuum). The plane Pv intersects the seed path at a location vertically above an upper end of the brush 238 (i.e., such that a vertical plane intersects both the upper end of the brush and the intersection of the plane Pv and the seed path) such that seeds 42 released counterclockwise (on the view of FIG. 6) of the plane Pv and clockwise of a lower portion of the brush will be retained in the meter 230 upon being released from the seed disc 232. Thus the threshold applied at step 725 preferably corresponds to a seed disc rotation of at least an angle B (FIG. 6) sufficient to rotate a seed aperture 235 from the plane Pc to the plane Pv. The angle B may be approximately 45 degrees. The threshold applied at step 725 preferably corresponds to a seed disc rotation greater than the angle B, e.g., a quarter-rotation, half rotation, full rotation, or two full rotations of the seed disc 232.

The process 700 may be carried out with respect to individual meters or a plurality of meters. In one embodiment, if a seed disc unload condition is identified as to a single meter at step 715, steps 720, 725, 730 are carried out as to that single meter. In a second embodiment, if a seed disc unload condition is identified as to a single meter at step 715, steps 720, 725, 730 are carried out as to all of the meters on the planter 10. In either embodiment, steps 720, 725, 730 are preferably carried out on a meter-by-meter basis; that is, the monitor 50 carries out step 725 using a motor encoder signal from a given drive 310 in order to determine whether the threshold has been met for that drive, and stops that drive at step 730 when the threshold has been met for that drive. Thus it should be appreciated that the drives 310 associated with various row units may not stop simultaneously.

Figure 8:
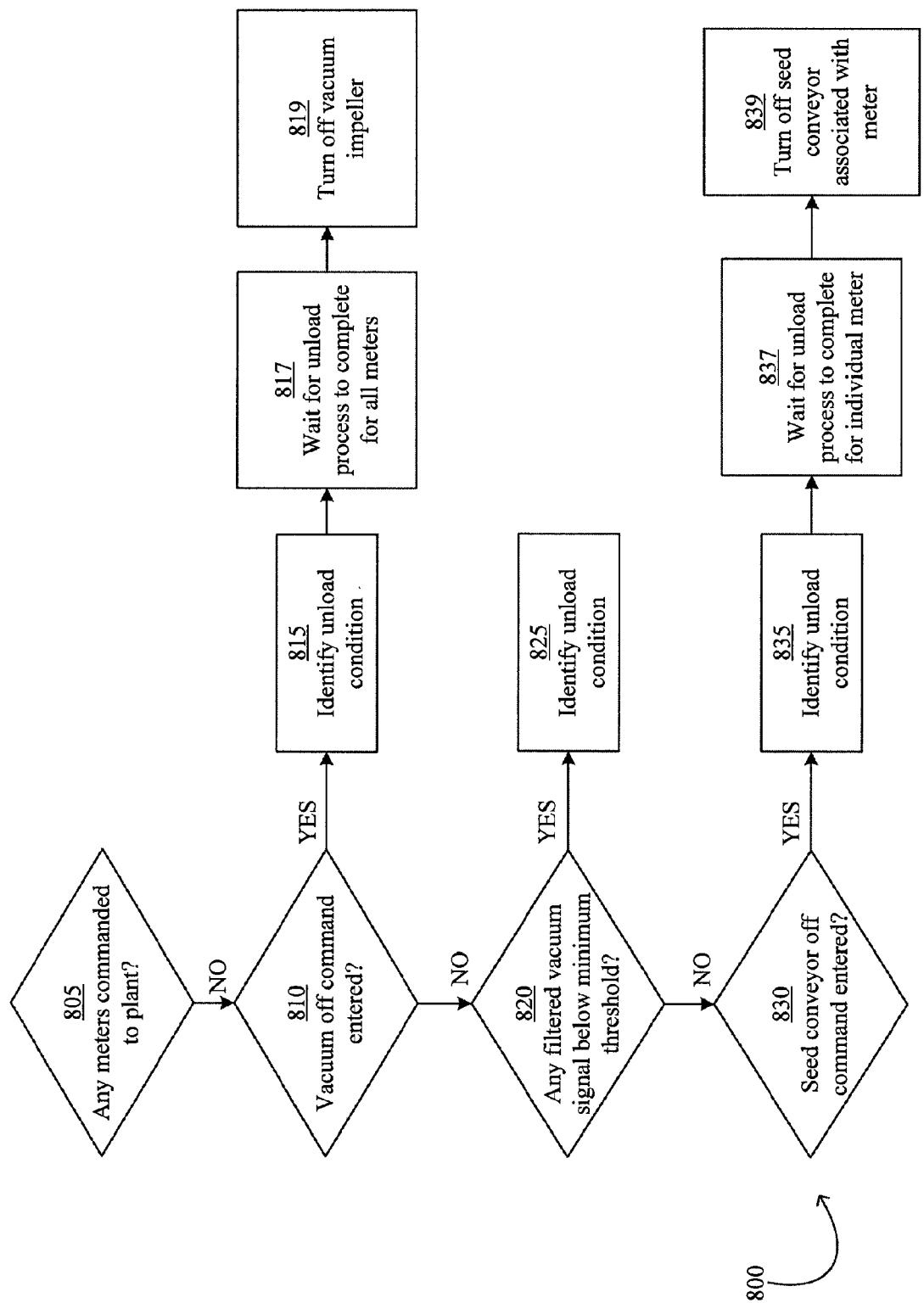
FIG. 8 illustrates a process for identifying a seed meter unload condition.

Turning to FIG. 8, a preferred process 800 for identifying a seed disc unload condition is illustrated. At step 805, the monitor 50 preferably determines whether any of the drives 310 are currently being commanded to plant (e.g., drive the seed discs at a non-zero rate).

If no drives 310 are being commanded to plant, at step 810 the monitor 50 preferably determines whether a command to shut off the vacuum impeller has been entered to the monitor by the operator. If so, then at step 815, the monitor 50 preferably identifies an unload condition (e.g., determines that an unload condition has been met such that step 715 and subsequent steps of process 700 are carried out). At step 817, the monitor 50 waits for the unload process to complete for all the seed meters on the planter, and then subsequently at step 819 commands the vacuum switch 345 to turn off the vacuum impeller.

If no command has been entered to shut off the vacuum impeller, then at step 820 the monitor 50 preferably determines whether any of the signals generated by the vacuum sensors 340 are below a minimum threshold. A low pass filter is preferably applied to the vacuum sensor signals, or another suitable filter is applied such that very brief variations in the signal are ignored in performing step 820. The minimum threshold applied preferably corresponds to a vacuum pressure of between 9.5 and 11 inches of water and preferably about 10 inches of water. If any filtered vacuum sensor signal is below the minimum threshold, then at step 825 the monitor 50 preferably identifies an unload condition.

If no filtered vacuum sensor signal is below the minimum threshold, then at step 830 the monitor preferably determines whether any seed conveyor drive 315 has been commanded to turn off. If so, then at step 835 the monitor 50 preferably identifies an unload condition, at step 837 waits for one of the seed meters, and then subsequently at step 839 turns off the seed conveyor drive 315 associated with that meter. Steps 837, 839 are preferably repeated for each associated pair of seed meters 230 and seed conveyor drives 315. It should be appreciated that a seed meter and seed conveyor are associated if they are part of the same row unit, i.e., such that the meter is supplying seed to the seed conveyor.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method of controlling an agricultural implement having a plurality of row units, comprising:
   planting seeds with a seed disc of a seed meter by loading seeds from a seed pool onto said seed disc, rotating said seed disc in a first direction, and releasing seeds from said seed meter;
   unloading seeds from said seed disc into said seed pool by rotating said seed disc in a second direction and releasing seeds from said seed disc into said seed pool;
   identifying a seed disc unload condition, wherein said step of unloading seeds from said seed disc into said seed pool is carried out when said seed disc unload condition is identified;
   wherein said seed disc unload condition comprises a vacuum signal below a minimum vacuum threshold.

2. The method of claim 1, wherein said seed disc unload condition comprises a command to turn off a vacuum supply.

3. The method of claim 1, wherein said seed disc unload condition comprises a command to turn off a seed conveyor.

4. The method of claim 1, wherein said step of identifying a seed disc unload condition is carried out by a monitor in data communication with a seed sensor, wherein said monitor is in data communication with the Internet, wherein planting data is transmitted between said monitor and the Internet via said monitor.

5. A method of controlling an agricultural implement having a plurality of row units, comprising:
   planting seeds with a seed disc of a seed meter by loading seeds from a seed pool onto said seed disc, rotating said seed disc in a first direction, and releasing seeds from said seed meter; and
   unloading seeds from said seed disc into said seed pool by rotating said seed disc in a second direction and releasing seeds from said seed disc into said seed pool
   determining whether a rotation threshold is met; and
   stopping said seed disc from said rotating when said rotation threshold is met.

6. The method of claim 5, further comprising:
   reducing a vacuum supply to said seed disc such that seeds are released from said seed disc, wherein said rotation threshold is selected such that seeds released from said seed disc fall into said seed pool.

7. The method of claim 5, further comprising:
   reducing a vacuum supply to said seed disc such that seeds are released from said seed disc, wherein said rotation threshold is selected such that seeds released from said seed disc remain in said seed meter.

8. The method of claim 7, wherein seeds on said seed disc travel along a seed path, wherein a plane Pv intersects the rotational center of said seed disc, wherein said plane Pv intersects said seed path at a location vertically above an upper end of an obstruction retaining seeds in the meter, wherein a plane Pc intersects the rotational center of said seed disc, wherein said plane Pc intersects a seed release location, and wherein said rotation threshold corresponds to a rotation of said seed disc through an angle at least as large as an angle between said plane Pv and said plane Pc.

9. The method of claim 8, wherein said obstruction comprises a brush, said brush engaging said seed disc.

10. The method of claim 8, wherein said seed release location comprises a location at which said vacuum supply is substantially cut off from said seed disc.

11. The method of claim 8, wherein said rotation threshold corresponds to at least a quarter revolution of said seed disc.

12. The method of claim 5, wherein said step of identifying a seed disc unload condition is carried out by a monitor in data communication with a seed sensor, wherein said monitor is in data communication with the Internet, wherein planting data is transmitted between said monitor and the Internet via said monitor.

13. A method of controlling an agricultural implement having a plurality of row units, comprising:
   planting seeds with a seed disc of a seed meter by loading seeds from a seed pool onto said seed disc, rotating said seed disc in a first direction, and releasing seeds from said seed meter;
   unloading seeds from said seed disc into said seed pool by rotating said seed disc in a second direction and releasing seeds from said seed disc into said seed pool
   wherein said step of rotating said seed disc in said second direction is accomplished by commanding a motor to change an operating state; and
   wherein said step of commanding a motor to change an operating state is carried out by a monitor in data communication with a global positioning system.

14. The method of claim 13, wherein said step of identifying a seed disc unload condition is carried out by a monitor in data communication with a global positioning system.

15. The method of claim 8, wherein said step of commanding a motor to change an operating state is carried out by a monitor in data communication with a global positioning system.

16. The method of claim 15, wherein said step of identifying a seed disc unload condition is carried out by a monitor in data communication with a global positioning system.

17. The method of claim 16, wherein said step of identifying a seed disc unload condition is carried out by a monitor in data communication with a seed sensor, wherein said monitor is in data communication with the Internet, wherein planting data is transmitted between said monitor and the Internet via said monitor.

18. The method of claim 13, wherein said step of identifying a seed disc unload condition is carried out by a monitor in data communication with a seed sensor, wherein said monitor is in data communication with the Internet, wherein planting data is transmitted between said monitor and the Internet via said monitor.

* * * * *